(12) United States Patent
Kawakubo (10) Patent No.: US 11,719,610 B2
(45) Date of Patent: Aug. 8, 2023

(54) SURFACE REFERENCE DETECTING MECHANISM AND HARDNESS TESTER

(71) Applicant: MITUTOYO CORPORATION, Kanagawa (JP)

(72) Inventor: Yu Kawakubo, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 117 days.

(21) Appl. No.: 17/530,957

(22) Filed: Nov. 19, 2021

(65) Prior Publication Data
US 2022/0170834 A1    Jun. 2, 2022

(30) Foreign Application Priority Data

Dec. 1, 2020 (JP) .............................. JP2020-199450

(51) Int. Cl.
*G01N 3/42* (2006.01)
(52) U.S. Cl.
CPC .................................... *G01N 3/42* (2013.01)
(58) Field of Classification Search
CPC ...................................................... G01N 3/42
See application file for complete search history.

(56) References Cited

U.S. PATENT DOCUMENTS

| 5,309,754 A * | 5/1994 | Ernst ....................... G01N 3/42 73/81 |
| 9,046,456 B2 | 6/2015 | Furuta et al. |
| 10,663,381 B2 * | 5/2020 | Koshimizu ............. G01N 3/42 |
| 11,156,537 B2 * | 10/2021 | Kawazoe ................. G01N 3/08 |
| 11,536,636 B2 * | 12/2022 | Shinza .................... G01N 3/165 |
| 2018/0284000 A1 * | 10/2018 | Koshimizu ............ G01N 3/068 |
| 2021/0156777 A1 * | 5/2021 | Shinza .................. G06T 7/0004 |

FOREIGN PATENT DOCUMENTS

JP         2013-250105 A      12/2013

* cited by examiner

*Primary Examiner* — Freddie Kirkland, III
(74) *Attorney, Agent, or Firm* — Greenblum & Bernstein, P.L.C.

(57) ABSTRACT

An indenter reference that is brought into contact with an axial second side surface of a sample which is arranged further toward an axial first side than an indenter, the indenter reference serving as a position reference for the indenter; a holder that detachably holds the indenter reference and is coupled with the indenter reference; an indenter position detector that couples with the holder and detects a relative position of the indenter with respect to the indenter reference; a regulator that allows displacement between a first position that regulates movement of the indenter reference with respect to the holder and a second position where the indenter reference can be removed from the holder; and a biasing portion that biases the regulator to be kept at the first position.

16 Claims, 7 Drawing Sheets

SURFACE REFERENCE DETECTING MECHANISM AND HARDNESS TESTER

CROSS-REFERENCE TO RELATED APPLICATIONS

The present application claims priority under 35 U.S.C. § 119 of Japanese Application No. 2020-199450, filed on Dec. 1, 2020, the disclosure of which is expressly incorporated by reference herein in its entirety.

BACKGROUND OF THE INVENTION

1. Field of the Invention

The present invention relates to a surface reference detecting mechanism that detects a surface position of a sample and a hardness tester using the surface reference detecting mechanism.

2. Description of Related Art

Conventionally, a hardness tester is known which tests the hardness of a sample by pressing an indenter provided to a distal end of an indenter shaft into a surface of the sample and measuring an indentation depth of the indenter (see, for example, Japanese Patent Laid-open Publication No. 2013-250105).

The hardness tester noted above detects the surface position by a contactor (also referred to as "indenter reference") that configures the surface reference detecting mechanism, the contactor contacting the surface of the sample and detecting a position of the indenter that is further pressed into the surface of the sample. In addition, the hardness tester measures the indentation depth of the indenter based on both detected positions as described above. The contactor is fixed to the hardness tester by a screw at a position facing the surface of the sample.

When a type of the indenter or sample changes, the surface reference detecting mechanism must be replaced with a contactor that is suitable. When the contactor is fixed by the screw as in the prior art, a tool such as a driver is necessary to replace the contactor and such work requires time, and thus there is room to improve replacement work.

SUMMARY OF THE INVENTION

In order to resolve the above circumstances, the present invention provides a surface reference detecting mechanism that can improve replacement work of an indenter reference contacting a surface of a sample, and a hardness tester.

In order to address the above circumstances, one aspect of the present invention is the surface reference detecting mechanism and includes an indenter shaft, an indenter reference, a holder, an indenter position detector, a regulator, and a biasing portion. The indenter shaft is arranged along a center axis, includes at an axial fist side end an indenter that is pressed against a sample, and can be displaced in an axis direction. The indenter reference is brought into contact with an axial second side surface of the sample which is arranged further toward the axial first side than the indenter, the indenter reference serving as a position reference for the indenter. The holder detachably holds the indenter reference and is operated together with the indenter reference. The indenter position detector is linked with the holder and detects a relative position of the indenter with respect to the indenter reference. The regulator allows displacement between a first position that regulates movement of the indenter reference with respect to the holder and a second position where the indenter reference can be removed from the holder. The biasing portion biases the regulator to be kept at the first position. By applying an external force that resists a biasing force of the biasing portion, the bias by the biasing portion is lifted and the regulator can be displaced to the second position. According to the present invention, with the external force that resists the biasing force of the biasing portion, the indenter reference can be removed, and therefore, the indenter reference can be replaced with a simple operation.

A preferred aspect of the present invention is the surface reference detecting mechanism, where the indenter reference includes a groove into which the regulator fits. According to the present invention, by fitting the regulator into the groove of the indenter reference, the movement of the indenter reference can be regulated.

A preferred aspect of the present invention is the surface reference detecting mechanism, where the regulator is a spherical member. According to the present invention, the regulator which is a spherical member can be displaced between the first position and the second position by rolling, and therefore the regulator can be displaced with a simple configuration.

In addition, a preferred aspect of the present invention is the surface reference detecting mechanism, where the holder includes a taper that rolls the regulator to the second position. According to the present invention, with the taper of the holder, the regulator is readily displaced to the second position when not biased by the biasing portion and the indenter reference can be removed readily.

In addition, a preferred aspect of the present invention is the surface reference detecting mechanism, where the indenter reference includes an abutment that is brought into contact with an axial first side end of the holder from the axial first side. According to the present invention, with the abutment of the indenter reference abutting the axial first side end of the holder, when the indenter reference contacts the sample surface, the surface reference of the sample can be detected without causing a shift in position between the indenter reference and the holder.

In addition, a preferred aspect of the present invention is a hardness tester that performs a hardness test on a sample by pressing the indenter against the sample, and includes the surface reference detecting mechanism; a reference driver that displaces the indenter reference in the axis direction; an indenter shaft driver that displaces the indenter shaft in the axis direction and presses an axial first side end of the indenter against the axial second side surface of the sample which is arranged further toward the axial first side than the indenter; and a detector that detects the relative position of the indenter with respect to the indenter reference by pressing the indenter against the sample in a state where the indenter reference is brought into contact with the sample. According to the present invention, replacement of the indenter reference can be performed in the hardness tester with a simple operation since the indenter reference can be removed by the external force that resists the biasing force of the basing portion.

The present invention can provide the surface reference detecting mechanism that can improve the work of replacing the indenter reference contacting the surface of the sample, and the hardness tester. Challenges, configurations, and effects other than those described above are clarified by the description of the following embodiments.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, apparatuses related to the present invention such as a surface reference detecting mechanism and a hardness tester are described in detail with reference to the drawings. In the drawings noted below, the scale or number of each configuration may differ from the actual configuration in order to facilitate understanding.

Further, the drawings show an XYZ coordinate system as an appropriate 3D rectangular coordinate system. In the XYZ coordinate system, the Z axis direction is a direction parallel to a center axis J of an indenter shaft 27 illustrated in FIG. 1. Of the directions orthogonal to the Z axis direction, the Y axis direction is a left-to-right direction in FIG. 1. The X axis direction is a direction orthogonal to both the Y axis and Z axis directions. In all of the X axis, Y axis, and Z axis directions, a pointing side of an arrow in the drawings shows the + side and the opposite side from the pointing side shows the – side.

Figure 1:
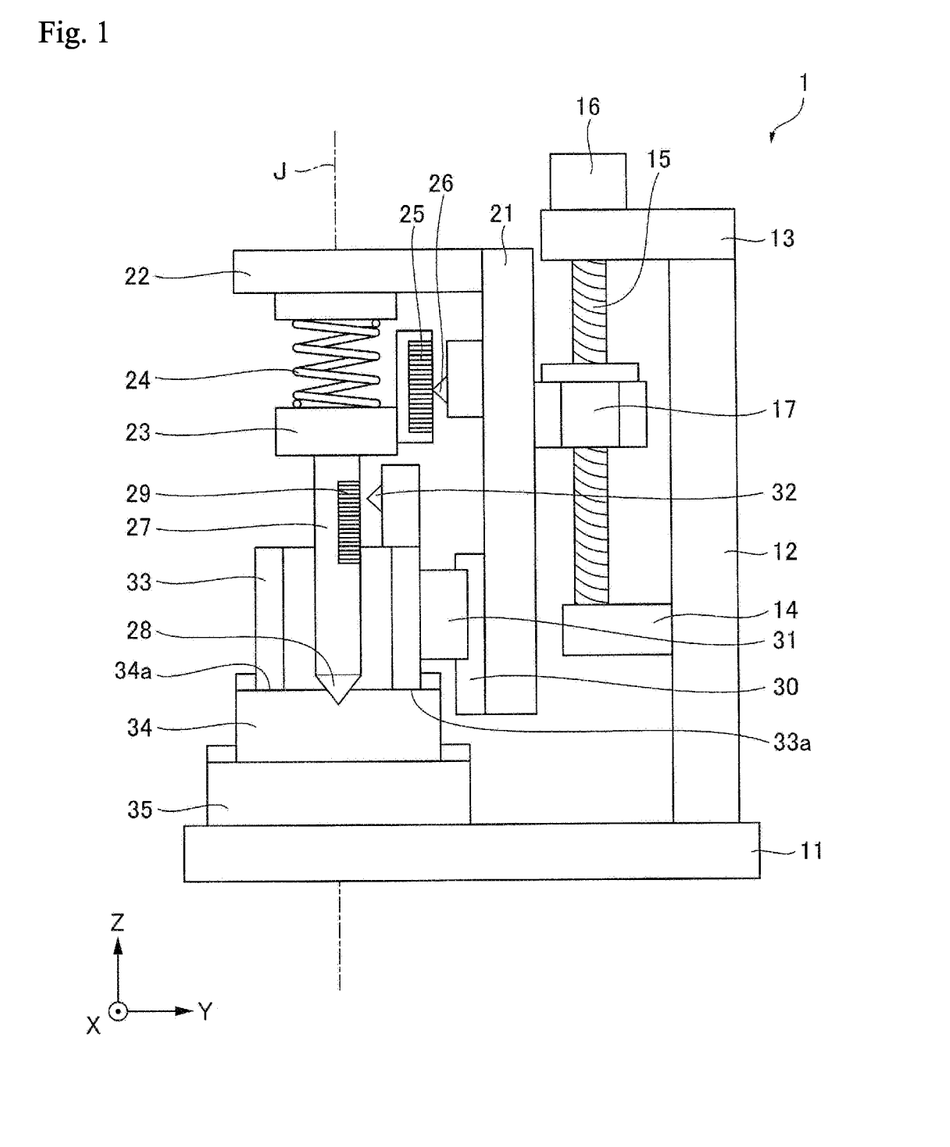
FIG. 1 is a side view illustrating a schematic configuration of a surface reference detecting mechanism and a hardness tester according to an embodiment of the present invention.

In the following description, the direction parallel to the Z axis is simply referred to as "axis direction", downward in the axis direction (that is, –Z side) in FIG. 1 is referred to as an axial first side, and upward in the axis direction (that is, +Z side) in FIG. 1 is referred to as an axial second side. Also, a diameter direction centered on the center axis J is simply referred to as "diameter direction" and a direction around an axis centered on the center axis J is simply referred to as "circumference direction". Further, in the diameter direction, a side closer to the center axis J is referred to as a diametrically interior side and a far side from the center axis J is referred to as a diametrically exterior side. In the X axis direction, the negative side (–X side) is referred to as a "first side" and the positive side (+X side) is referred to as a "second side". In the Y axis direction, the negative side (–Y side) is referred to as a "first side" and the positive side (+Y side) is referred to as a "second side".

In the present specification, "extend in the Z axis direction" includes extending strictly in the Z axis direction as well as extending in a direction tilted in a range of less than 45° with respect to the Z axis direction. Further, the same also applies to the X axis direction and Y axis direction. In addition, "orthogonal" also includes a case where the angle formed between two axis directions is tilted in a range of less than 45°, in addition to a case of being strictly orthogonal. In addition, "parallel" also includes a case where the angle formed between two axis directions is tilted in a range of less than 45°, in addition to a case of being strictly parallel.

Designations such as axis direction, diameter direction, circumference direction, first side, second side, exterior side, interior side, upward, downward, right side, and left side are used to simply explain a relative positional relationship of each portion, but the actual placement relationship may be arranged other than the placement relationship described with these designations. Further, in the present specification, the orientation such as front-back, left-right, and up-down show the direction on the drawings, and are not limited to these orientations when using an apparatus related to the present invention.

Structure of Hardness Tester 1

FIG. 1 is a side view illustrating a schematic configuration of a surface reference detecting mechanism and a hardness tester according to an embodiment of the present invention. A hardness tester 1 of the present embodiment performs a hardness test of a sample 34 by pressing an indenter 28 into a surface 34a of the sample 34. The surface reference detecting mechanism is a mechanism, in the hardness tester 1, that includes a configuration detecting a surface position of the sample 34. The surface reference detecting mechanism includes an indenter shaft 27, indenter reference 33, holder 31, indenter position detector 32, regulators 108a, 108b, and 108c (shown in FIG. 5), and a biasing portion 106 (shown in FIG. 2), for example.

The hardness tester 1 includes a base portion 11 that expands in the X axis direction and Y axis direction on the axial first side, an X-Y stage 35 that is arranged on the base portion 11 and on which the sample 34 is fixed, a support column 12 that extends to the axial second side at a position further on the second side in the Y axis direction than the X-Y stage 35 on the base portion 11, an upper support portion 13 that extends to the first side in the Y axis direction at a position of an axial second side end of the support column 12, a lower support portion 14 that extends to the first side in the Y axis direction from the support column 12 at a position further to the axial first side than the upper support portion 13, a ball screw 15 that extends in the axis direction between the upper support portion 13 and the lower support portion 14, a motor 16 that rotates the ball screw 15 centered on a shaft of the ball screw 15, and a head assembly 17 through which the ball screw 15 passes. The head assembly 17 is fitted with the ball screw 15 by a screw and is displaced in the axis direction accompanying rotation of the ball screw 15.

The hardness tester 1 includes a side support portion 21 that is fixed to the head assembly 17, a top support portion 22 that extends to the first side in the Y axis direction at a position of an axial second side end of the side support portion 21, an elastic member 24 that is provided on the axial first side of the top support portion 22, and an indenter shaft 27 that is provided on the axial first side of the elastic member 24. The side support portion 21 displaces in the axis direction accompanying the displacement of the head assembly 17 in the axis direction. The top support portion 22 is fixed to the side support portion 21. The indenter shaft 27 is arranged along the center axis J. The indenter shaft 27 includes, at an axial first side end, an indenter 28 that is pressed against the sample 34, and the indenter shaft 27 can be displaced in the axis direction.

The hardness tester 1 includes an indenter reference 33, a holder 31 that detachably holds the indenter reference 33, and an indenter position detector 32 that is operated together with the holder 31. The side support portion 21 includes a slide 30. The slide 30 is fixed to the side support portion 21. The slide 30 supports the holder 31 such that the holder 31 can displace in the axis direction. The indenter shaft 27 includes scale marks 29. The indenter position detector 32 detects a relative position of the indenter 28 with respect to the indenter reference 33 by optically reading the scale marks 29, for example.

Scale marks 25 are provided to an end portion 23 (axial second side end) of the indenter shaft 27. The side support portion 21 includes a test force detector 26. The test force detector 26 is fixed to the side support portion 21. The test force detector 26 detects a relative position of the end portion 23 with respect to the side support portion 21 by optically reading the scale marks 25, for example.

Operation of Hardness Tester 1

First, the hardness tester 1 defines an initial setting, by rotating the motor 16, such that an axial first side end of the indenter 28 and an axial first side end of the indenter reference 33 are positioned at an initial position further to the axial second side than the surface 34a of the sample 34. Next, an operator of the hardness tester 1 places and fixes the sample 34 on the X-Y stage 35 for the hardness test of the sample 34. Then, the X-Y stage 35 displaces the surface 34a within a plane that is orthogonal to the axis direction such that a position on the surface 34a of the sample 34 to be tested matches the center axis J in the X axis direction and Y axis direction.

Next, the hardness tester 1 displaces the side support portion 21 to the axial first side by rotating the motor 16. By doing so, the indenter reference 33 is displaced together with the side support portion 21 to the axial first side and a surface 33a of the axial first side end of the indenter reference 33 comes into contact with the surface 34a of the sample 34. An axis direction position of the indenter reference 33 when the surface 33a of the indenter reference 33 is in contact with the surface 34a of the sample 34 is defined as a reference position. The hardness tester 1 further rotates the motor 16 to displace the side support portion 21 further to the axial first side, but the indenter reference 33 contacts the sample 34 and further displacement to the axial first side is blocked.

Accordingly, the holder 31 holding the indenter reference 33 slides with respect to the slider 30 in the axis direction and the indenter reference 33 stops at the reference position.

In a state where the indenter reference 33 is stopped at the reference position, the hardness tester 1 further rotates the motor 16 and further displaces the side support portion 21 to the axial first side such that the axial first side end of the indenter 28 contacts the surface 34a of the sample 34. The hardness tester 1 generates a specified test force with a biasing force of the elastic member 24 and presses the indenter 28 into the sample 34 with the specified test force. The hardness tester 1 adjusts the rotation of the motor 16 and controls the test force in response to detection results by the test force detector 26. The hardness tester 1 calculates the hardness of the sample 34 in response to the test results by the indenter position detector 32 when the indenter 28 is pressed into the sample 34 with the specified test force.

First Embodiment

Next, the surface reference detecting mechanism according to a first embodiment of the present invention is described with reference to the drawings. The present embodiment is an example illustrating details of the surface reference detecting mechanism in FIG. 1.

Structure of Surface Reference Detecting Mechanism 100

Figure 2:
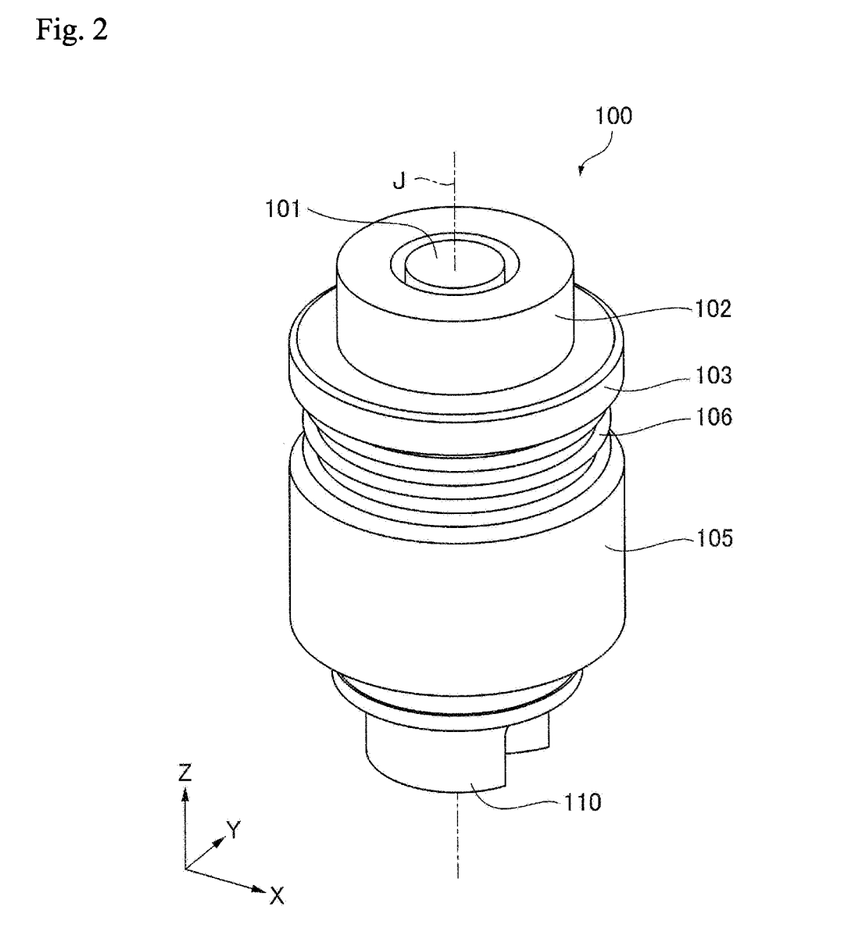
FIG. 2 is a perspective view illustrating an overview of the surface reference detecting mechanism according to a first embodiment of the present invention.

FIG. 2 is a perspective view illustrating an overview of the surface reference detecting mechanism according to the first embodiment of the present invention. Whether a configuration in a surface reference detecting mechanism 100 of the present embodiment corresponds to a configuration in the hardness tester 1 in FIG. 1 is described as needed.

The surface reference detecting mechanism 100 includes an indenter shaft 101 and a holder 102. The indenter shaft 101 corresponds to the indenter shaft 27 in FIG. 1. The holder 102 corresponds to the holder 31 in FIG. 1. In this embodiment, the indenter shaft 101 and the holder 102 extend further to the axial second side than a state illustrated in FIG. 2 and connect with the respective configuration illustrated in FIG. 1. However, this is omitted from FIG. 2.

The surface reference detecting mechanism 100 further includes an edge portion 103, a grip 105, a biasing portion 106, regulators 108a, 108b, and 108c (see FIG. 5), and an indenter reference 110. The surface reference detecting mechanism 100 of the present embodiment detachably holds the indenter reference 110 with the holder 102 and improves work efficiency when replacing the indenter reference 110.

Figure 3:
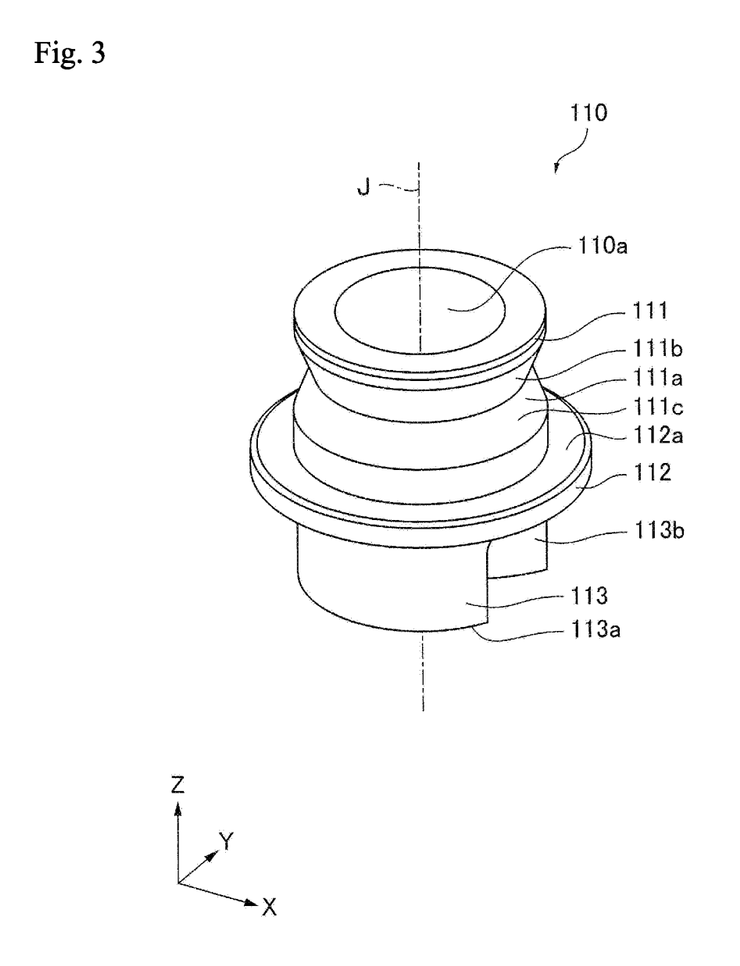
FIG. 3 is a perspective view of an indenter reference 110 illustrated in FIG. 2.

FIG. 3 is a perspective view of the indenter reference 110 illustrated in FIG. 2. The indenter reference 110 is a cylindrical member with a through-hole 110a through which the indenter shaft 101 passes. The indenter reference 110 includes a tubular portion 111 on the axial second side. The indenter reference 110 includes a contact portion 113 further to the axial first side than the tubular portion 111. The indenter reference 110 corresponds to the indenter reference 33 in FIG. 1

The tubular portion 111 includes, over the entire circumference in the circumferential direction, a groove 111a on its outer circumferential surface that is recessed toward the diametrically interior side. The groove 111a includes a taper 111b gradually tilting toward the diametrically interior side the further the taper 111b progresses from the axial second side end to the axial first side thereof. The groove 111a includes a taper 111c gradually tilting toward the diametrically interior side the further the taper 111c progresses from the axial first side end to the axial second side thereof. The tubular portion 111 includes a projection 112 projecting further to the axial first side and the diametrically exterior side than the groove 111a. The projection 112 includes a surface 112a on the axial second side.

The contact portion 113 includes a surface 113a contacting the sample 34 that is illustrated in FIG. 1. The surface 113a corresponds to the surface 33a in FIG. 1. The contact portion 113 includes a cut-out 113b through which the indenter shaft 101 is visible from the diametrically exterior side.

Figure 4:
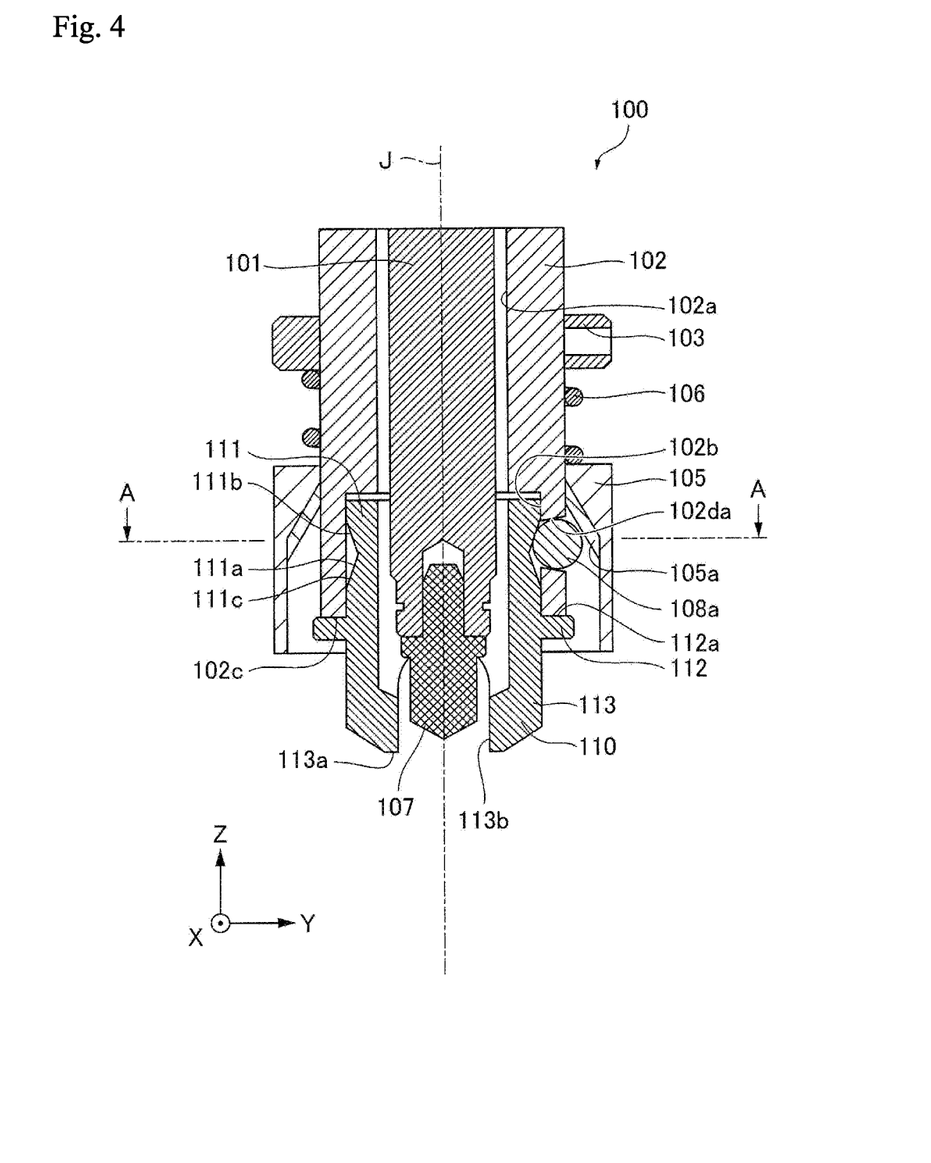
FIG. 4 is a cross-sectional side view illustrating a surface reference detecting mechanism 100 illustrated in FIG. 2 cut at a plane orthogonal to an X axis and passing through a center axis J.
Figure 5:
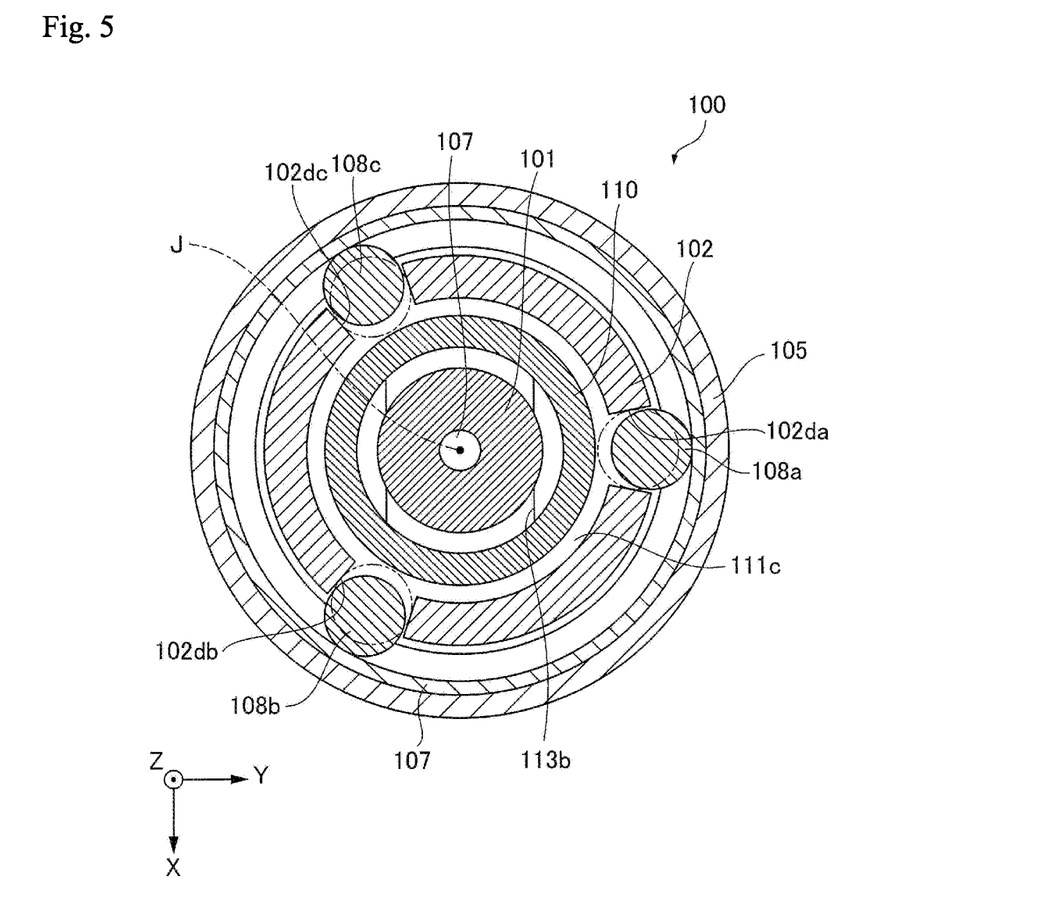
FIG. 5 illustrates a cross-sectional flat view along a line A-A of the surface reference detecting mechanism 100 illustrated in FIG. 4.

FIG. 4 is a cross-sectional side view illustrating the surface reference detecting mechanism 100 in FIG. 2 cut at a plane orthogonal to the X axis and passing through the center axis J. FIG. 4 illustrates a state where the indenter reference 110 is held by the holder 102. FIG. 5 illustrates a cross-sectional flat view along a line A-A of the surface reference detecting mechanism 100 illustrated in FIG. 4. The indenter shaft 101 is arranged along the center axis J and includes, at the axial first side end, an indenter 107. The indenter 107 corresponds to the indenter 28 in FIG. 1. The indenter shaft 101 can be displaced in the axis direction.

The holder 102 is a cylindrical member with a through-hole 102a through which the indenter shaft 101 passes. The holder 102 can be displaced in the axis direction. The holder 102 includes an inner circumferential surface 102a at the axial second side, and an inner circumferential surface 102b at the axial first side. An inner diameter of the inner circumferential surface 102a is smaller than the inner diameter of the inner circumferential surface 102b. The inner diameter of the inner circumferential surface 102a is smaller than an outer diameter of the tubular portion 111 of the indenter reference 110. The inner diameter of the inner circumferential surface 102b is larger than the outer diameter of the tubular portion 111 of the indenter reference 110. The tubular portion 111 of the indenter reference 110 can be accommodated in the holder 102 at the position of the inner circumferential surface 102b of the holder 102. At this time, a surface 102c of the axial first side end of the holder 102 comes into contact with the surface 112a of the indenter reference 110.

The holder 102 includes through-holes 102da, 102db, and 102dc which pass through the holder 102 from the diametrically exterior side to the diametrically interior side at positions on the inner circumferential surface 102b in the axis direction. The through-holes 102da, 102db, and 102dc are arranged at equal intervals in a circumference direction. Each of the through-holes 102da, 102db, and 102dc includes a taper in which a hole diameter decreases the further the through-hole progresses from the diametrically exterior side to the diametrically interior side. Each taper of the through-holes 102da, 102db, and 102dc is a taper where the position of the axial first side end thereof gradually tilts toward the axial first side the further the taper progresses from the diametrically interior side to the diametrically exterior side.

The surface reference detecting mechanism 100 includes the regulator 108a fitting into the through hole 102da, the regulator 108b fitting into the through-hole 102db, and the regulator 108c fitting into the through hole 102dc. Each of the regulators 108a, 108b, and 108c is a spherical member, for example. Each of the regulators 108a, 108b, and 108c is a steel ball, for example. The hole diameter of the through-holes 102da, 102db, and 102dc on the diametrically interior side is smaller than the diameter of the regulators 108a, 108b, and 108c. Accordingly, even when the holder 102 does not hold the indenter reference 110, the regulators 108a, 108b, and 108c do not fall off to the diametrically interior side through the through-holes 102da, 102db, and 102dc.

The surface reference detecting mechanism 100 includes, on the diametrically exterior side of the regulators 108a, 108b, and 108c, the grip 105 through which the holder 102 passes. The grip 105 is a tubular member. The grip 105 can be displaced in the axis direction along the outer circumferential surface of the holder 102.

The surface reference detecting mechanism 100 includes the edge portion 103 through which the holder 102 passes. The edge portion 103 is an annular-shaped member. The edge portion 103 is fixed to the diametrically exterior side of the holder 102 by a screw or the like. The edge portion 103 is positioned further to the axial second side than the grip 105. The surface reference detecting mechanism 100 includes the biasing portion 106 between the axial first side end of the edge portion 103 and the axial second side end of the grip 105. The biasing portion 106 is a coil spring, for example. The biasing portion 106 is biased further to the axial first side than the grip 105.

The grip 105 includes a taper 105a over the entire circumference in the circumferential direction in the inner circumferential surface thereof. The taper 105a is a taper gradually tilting toward the diametrically exterior side the further the taper 105a progresses from the axial second side end to the axial first side. The inner circumferential surface of the grip 105 maintains the inner diameter of the axial first side end of the taper 105a until the axial first side end of the grip 105. The distance in the diameter direction from the outer circumferential surface of the holder 102 to the inner circumferential surface of the grip 105 is smaller than the diameter of the regulators 108a, 108b, and 108c. Therefore, the regulators 108a, 108b, and 108c do not fall off to the outside from between the holder 102 and the grip 105.

When the biasing portion 106 biases the grip 105 to the axial first side, the grip 105 is displaced to the axial first side. With the displacement of the grip 105, the regulators 108a, 108b, and 108c are biased to the diametrically interior side along the taper 105a of the grip 105. Due to this bias, the regulators 108a, 108b, and 108c roll to the diametrically interior side and a diametrically interior side end of each biases the taper 111b of the indenter reference 110 to the diametrically interior side and the axial second side. By biasing the taper 111b to the diametrically interior side and the axial second side at the three points of the regulators 108a, 108b, and 108c, the indenter reference 110 is displaced to the axial second side. With the displacement of the indenter reference 110, a surface 112a of the indenter reference 110 comes into contact with a surface 102c of the holder 102 and the displacement of the indenter reference 110 toward the axial second side stops. In this state, the displacement of the indenter reference 110 toward the axial second side is regulated by the surface 112a coming into contact with the surface 102c, and the displacement of the indenter reference 110 toward the axial first side is regulated with the regulators 108a, 108b, and 108c biasing the taper 111b to the diametrically interior side and the axial second side. Accordingly, the indenter reference 110 is held by the holder 102 and is fixed.

Operation of Surface Reference Detecting Mechanism 100

Figure 6:
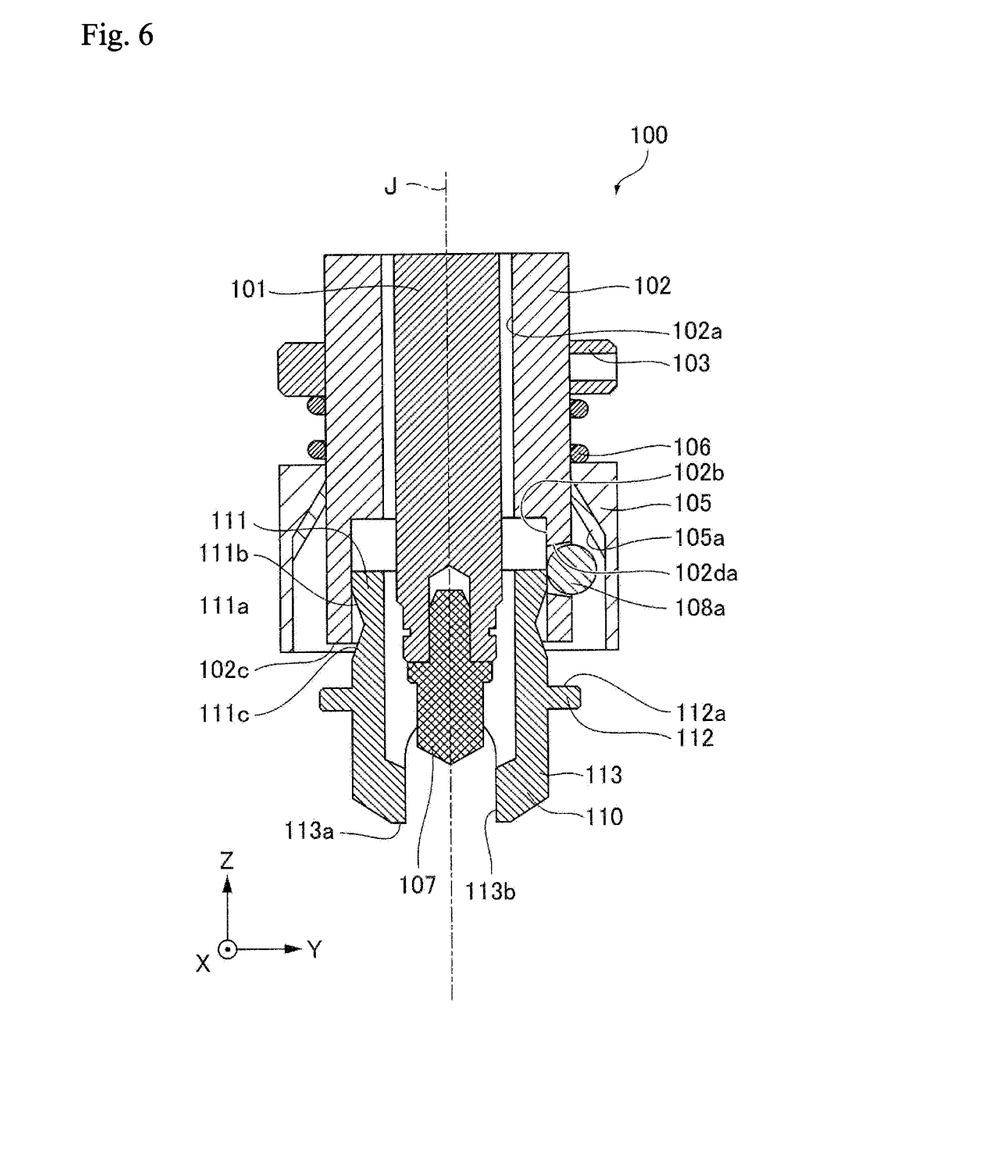
FIG. 6 is a cross-sectional side view illustrating the surface reference detecting mechanism 100 illustrated in FIG. 2 cut at a plane orthogonal to the X axis and passing through the center axis J, and illustrates a state where a grip 105 is operated.

FIG. 6 is a cross-sectional side view illustrating the surface reference detecting mechanism 100 in FIG. 2 cut at a plane orthogonal to the X axis and passing through the center axis J and illustrates a state where the grip 105 is operated.

The operator of the hardness tester 1 first operates the grip 105 in order to remove the indenter reference 110 from the holder 102 when replacing the indenter reference 110 from the state illustrated in FIG. 4. This operation is performed by displacing the grip 105 to the axial second side against the biasing force of the biasing portion 106.

When the grip 105 is displaced to the axial second side in the state illustrated in FIG. 4, the regulators 108a, 108b, and 108c do not receive the biasing force that biases to the diametrically interior side and can be displaced to the diametrically exterior side. Accordingly, as shown in FIG. 6, the regulation on the displacement of the indenter reference 110 toward the axial first side is lifted, and the operator can remove the indenter reference 110 from the holder 102. FIG. 4 shows an example where the regulators 108a, 108b, and 108c are at a first position that regulates the movement of the indenter reference 110 with respect to the holder 102. FIG. 6 shows an example where the regulators 108a, 108b, and 108c are at a second position where the indenter reference 110 can be removed from the holder 102. The regulators 108a, 108b, and 108c can be displaced between the first position and the second position. The biasing portion 106 biases the regulators 108a, 108b, and 108c to be kept at the first position.

Figure 7:
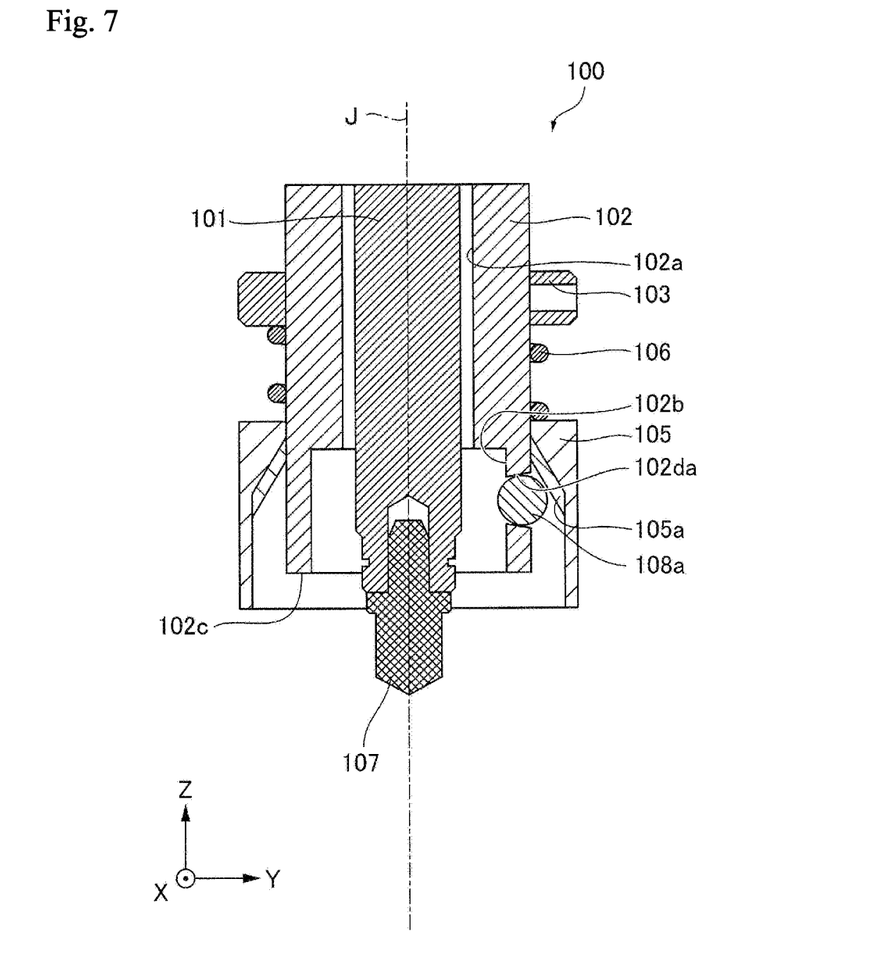
FIG. 7 is a cross-sectional side view illustrating the surface reference detecting mechanism 100 illustrated in FIG. 2 cut at the plane orthogonal to the X axis and passing through the center axis J, and illustrates a state where the indenter reference 110 is removed from a holder 102.

FIG. 7 is a cross-sectional side view illustrating the surface reference detecting mechanism 100 illustrated in FIG. 2 cut at the plane orthogonal to the X axis and passing through the center axis J, and illustrates a state where the indenter reference 110 is removed from the holder 102.

After removing the indenter reference 110 from the holder 102, as shown in FIG. 7, the operator stops operating the grip 105 and the grip 105 is displaced to the axial first side. At this time, as noted above, the hole diameter of the through-holes 102da, 102db, and 102dc on the diametrically interior side is smaller than the diameter of the regulators 108a, 108b, and 108c, and therefore the regulators 108a, 108b, and 108c do not fall off to the diametrically interior side through the through-holes 102da, 102db, and 102dc.

From the state illustrated in FIG. 7, when the indenter reference 110 is attached to the holder 102, the operator faces the surface 113a of the indenter reference 110 to the axial first side and inserts the indenter reference 110 from the axial first side into the inner circumferential surface 102b of the holder 102. At this time, the operator may insert the indenter reference 110 into the holder 102 while displacing the grip 105 to the axial second side. By inserting the indenter reference 110 until the regulators 108a, 108b, and 108c reach the groove 111a of the indenter reference 110, the attachment of the indenter reference 110 is completed.

In addition, to improve ease of inserting the indenter reference 110 into the holder 102, the indenter reference 110 may include a taper on a shoulder on the diametrically exterior side of the axial second side end, with the taper gradually tilting toward the diametrically interior side the further the taper progresses from the axial first side to the axial second side.

Moreover, the present invention is not limited to the embodiment described above, and includes various modifications. For example, the embodiment above is described in detail to facilitate understanding of the present invention, however, the present invention is not necessarily limited to this description that includes all the configurations. Further, it is possible to replace a portion of a configuration in one embodiment with a configuration of another embodiment, and the configuration in the other embodiment can also be added to the configuration in the one embodiment. Furthermore, a portion of the configuration in the various embodiments can have other configurations added/omitted/replaced.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface reference detecting mechanism comprising:
   an indenter shaft that is arranged along a center axis and that is displaceable in an axis direction, the indenter shaft including an indenter configured to be pressed against a sample,
   an indenter reference that is contactable with an axial second side surface of the sample which is arranged further toward the axial first side than the indenter, the indenter reference serving as a position reference for the indenter;
   a holder that detachably holds the indenter reference and is coupled with the indenter reference;
   an indenter position detector that couples with the holder and detects a relative position of the indenter with respect to the indenter reference;
   a regulator that allows displacement between a first position that regulates movement of the indenter reference with respect to the holder and a second position where the indenter reference can be removed from the holder; and
   a biasing portion that biases the regulator to be kept at the first position, wherein:
   by applying an external force that resists a biasing force of the biasing portion, the bias by the biasing portion is released, and
   the regulator is displaceable to the second position.

2. The surface reference detecting mechanism according to claim 1, wherein the indenter reference comprises a groove into which the regulator fits.

3. The surface reference detecting mechanism according to claim 2, wherein the regulator is spherical.

4. The surface reference detecting mechanism according to claim 3, wherein the holder comprises a taper that rolls the regulator to the second position.

5. The surface reference detecting mechanism according to claim 1, wherein the indenter reference comprises an abutment that is brought into contact with an axial first side end of the holder from the axial first side.

6. The surface reference detecting mechanism according to claim 2, wherein the indenter reference comprises an abutment that is brought into contact with an axial first side end of the holder from the axial first side.

7. The surface reference detecting mechanism according to claim 3, wherein the indenter reference comprises an abutment that is brought into contact with an axial first side end of the holder from the axial first side.

8. The surface reference detecting mechanism according to claim 4, wherein the indenter reference comprises an abutment that is brought into contact with an axial first side end of the holder from the axial first side.

9. A hardness tester that performs a hardness test, the hardness tester comprising:
   a surface reference detecting mechanism comprising:
   an indenter shaft that is arranged along a center axis and that is displaceable in an axis direction, the indenter shaft including an indenter configured to be pressed against a sample,
   an indenter reference that is contactable with an axial second side surface of the sample which is arranged further toward the axial first side than the indenter, the indenter reference serving as a position reference for the indenter;
   a holder that detachably holds the indenter reference and is coupled with the indenter reference;
   an indenter position detector that couples with the holder and detects a relative position of the indenter with respect to the indenter reference;
   a regulator that allows displacement between a first position that regulates movement of the indenter reference with respect to the holder and a second position where the indenter reference can be removed from the holder; and
   a biasing portion that biases the regulator to be kept at the first position, wherein:
   by applying an external force that resists a biasing force of the biasing portion, the bias by the biasing portion is released, and
   the regulator is displaceable to the second position;
   a reference driver that displaces the indenter reference in the axis direction;
   an indenter shaft driver that displaces the indenter shaft in the axis direction and presses an axial first side end of the indenter against the axial second side surface of the sample which is arranged further toward the axial first side than the indenter; and
   a detector that detects the relative position of the indenter with respect to the indenter reference by pressing the indenter against the sample in a state where the indenter reference is brought into contact with the sample.

10. The hardness tester according to claim 9, wherein the indenter reference comprises a groove into which the regulator fits.

11. The hardness tester according to claim 10, wherein the regulator is spherical.

12. The hardness tester according to claim 11, wherein the holder comprises a taper that rolls the regulator to the second position.

13. The hardness tester according to claim 9, wherein the indenter reference comprises an abutment that is brought into contact with an axial first side end of the holder from the axial first side.

14. The hardness tester according to claim 10, wherein the indenter reference comprises an abutment that is brought into contact with an axial first side end of the holder from the axial first side.

15. The hardness tester according to claim 11, wherein the indenter reference comprises an abutment that is brought into contact with an axial first side end of the holder from the axial first side.

16. The hardness tester according to claim 12, wherein the indenter reference comprises an abutment that is brought into contact with an axial first side end of the holder from the axial first side.

\* \* \* \* \*